United States Patent
Wallace et al.

(10) Patent No.: US 11,052,820 B2
(45) Date of Patent: Jul. 6, 2021

(54) VARIABLE LIGHTING SYSTEM FOR A VEHICLE

(71) Applicant: Gulfstream Aerospace Corporation, Savannah, GA (US)

(72) Inventors: Matthew Wallace, Savannah, GA (US); Stephen Spencer, Savannah, GA (US); Timothy O'Hara, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 16/949,123

(22) Filed: Oct. 14, 2020

(65) Prior Publication Data

US 2021/0114516 A1   Apr. 22, 2021

Related U.S. Application Data

(60) Provisional application No. 62/916,548, filed on Oct. 17, 2019.

(51) Int. Cl.
| | |
|---|---|
| *B60Q 3/47* | (2017.01) |
| *F21V 23/00* | (2015.01) |
| *B64D 11/00* | (2006.01) |
| *F21S 10/06* | (2006.01) |
| *F21Y 115/10* | (2016.01) |

(52) U.S. Cl.
CPC ............... *B60Q 3/47* (2017.02); *B64D 11/00* (2013.01); *F21S 10/06* (2013.01); *F21V 23/003* (2013.01); *B64D 2203/00* (2013.01); *F21Y 2115/10* (2016.08)

(58) Field of Classification Search
CPC ...... B64D 11/00; B64D 2203/00; B60Q 3/47; F21V 23/003; F21S 10/06; F21Y 2115/10
See application file for complete search history.

(56) References Cited

U.S. PATENT DOCUMENTS

| | | | |
|---|---|---|---|
| 5,647,658 A | 7/1997 | Ziadi | |
| 2002/0000491 A1* | 1/2002 | Nieberle | B64D 11/00 244/118.6 |
| 2007/0109802 A1 | 5/2007 | Camp, III et al. | |

(Continued)

FOREIGN PATENT DOCUMENTS

| | | |
|---|---|---|
| DE | 102017222174 A1 | 10/2018 |
| DE | 102017116536 A1 | 1/2019 |

(Continued)

*Primary Examiner* — Kevin Quarterman
(74) *Attorney, Agent, or Firm* — LKGlobal | Lorenz & Kopf, LLP

(57) ABSTRACT

Interior panels for an interior of a vehicle, vehicles, and methods for making interior panels for an interior of a vehicle are provided. In one example, the interior panel includes a first trim section having a first exposed surface configured to face towards the interior. A second trim section that has a second exposed surface configured to face towards the interior is disposed adjacent to and spaced apart from the first trim section to define a gap. A first lighting array that includes light sources is configured to be disposed proximate the gap hidden from the interior by the second trim section. A controller is configured to be in communication with the first lighting array to independently direct each of the light sources to generate light that passes through the gap into the interior and illuminates the first exposed surface to define an illumination pattern.

20 Claims, 15 Drawing Sheets

(56) References Cited

U.S. PATENT DOCUMENTS

| | | | | |
|---|---|---|---|---|
| 2015/0166178 | A1* | 6/2015 | Savian | B60Q 3/44 |
| | | | | 244/118.6 |
| 2017/0246984 | A1* | 8/2017 | Snider | B60J 1/1876 |
| 2019/0001878 | A1* | 1/2019 | Schneider | B29C 45/16 |
| 2019/0176679 | A1* | 6/2019 | Salter | B60Q 9/006 |
| 2020/0071000 | A1* | 3/2020 | Kohlmeier-Beckmann | |
| | | | | B32B 7/08 |

FOREIGN PATENT DOCUMENTS

| | | |
|---|---|---|
| DE | 102017213994 A1 | 2/2019 |
| EP | 2921773 A1 | 9/2015 |
| EP | 3300980 A1 | 4/2018 |
| FR | 3000711 A1 | 7/2014 |

\* cited by examiner

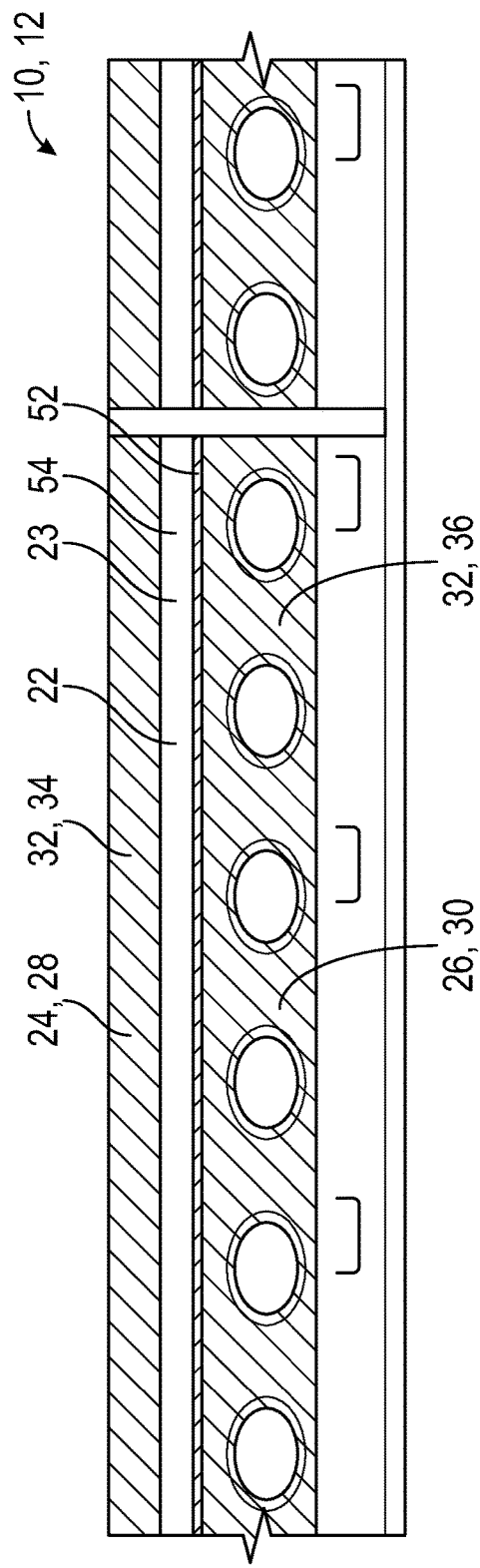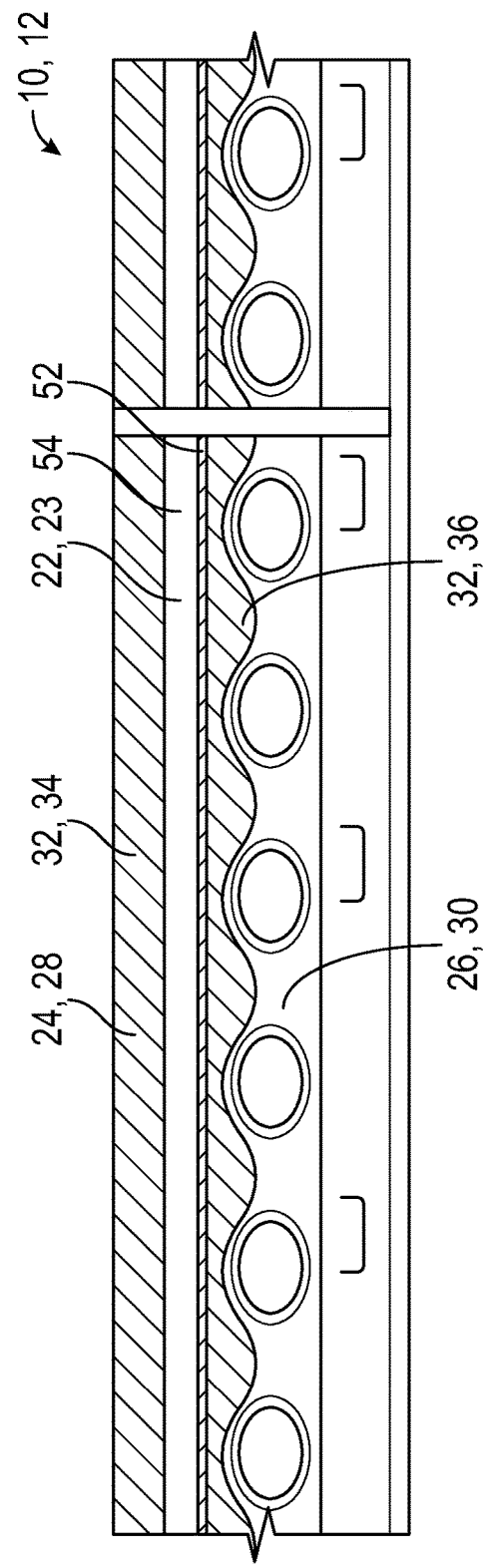

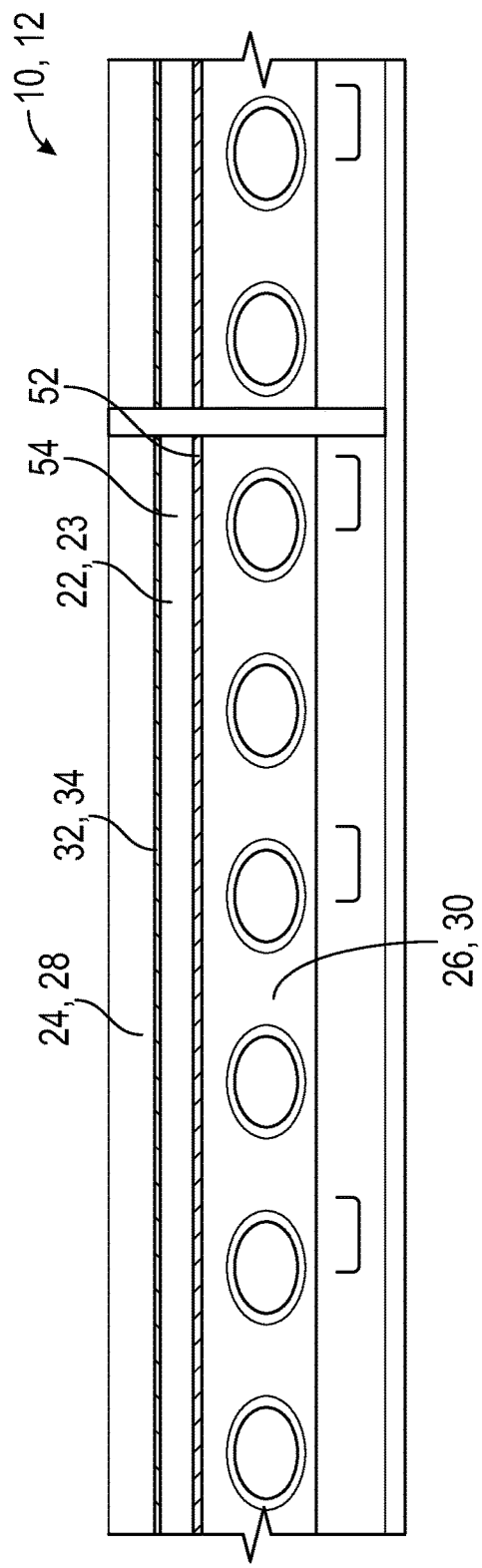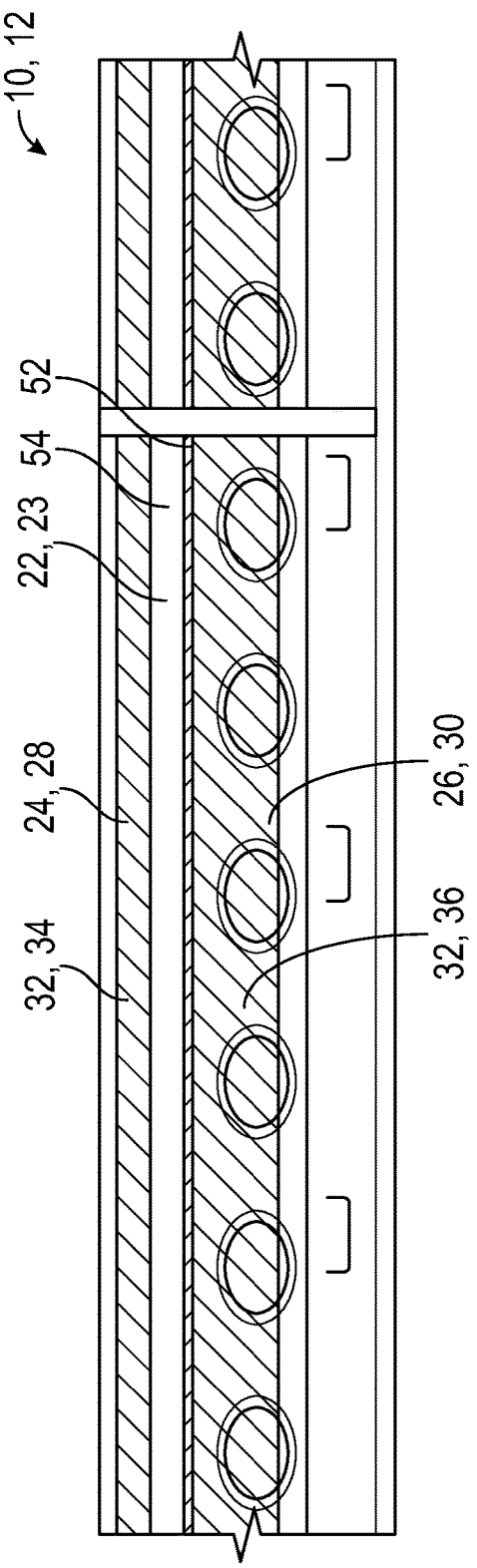

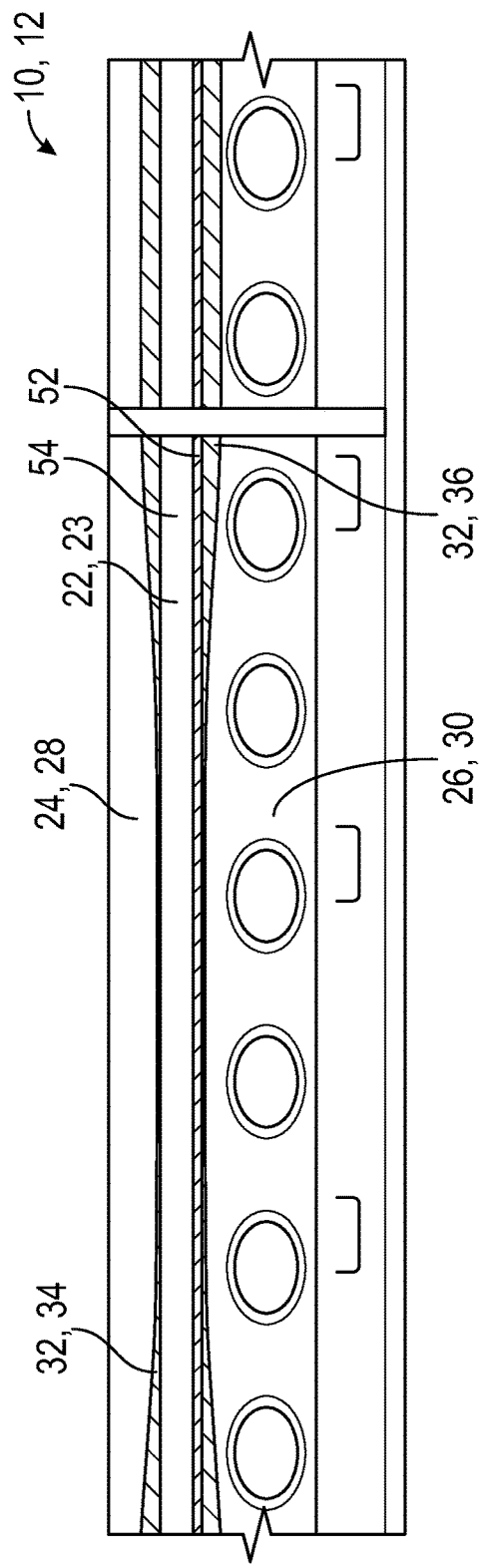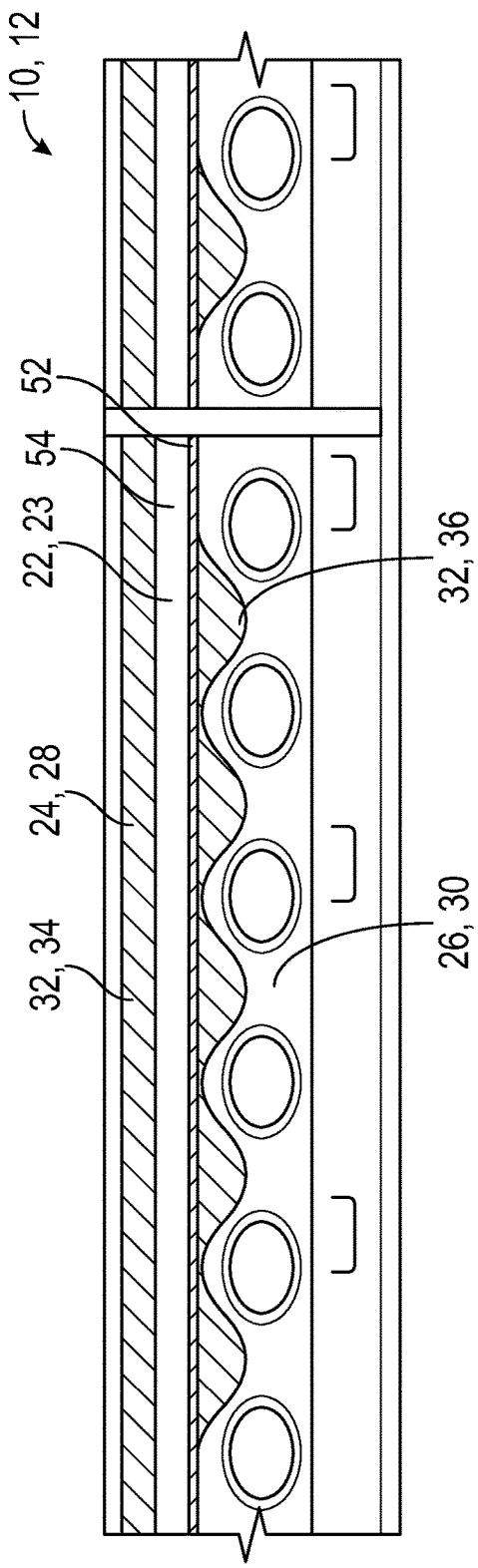
FIG. 11
FIG. 12

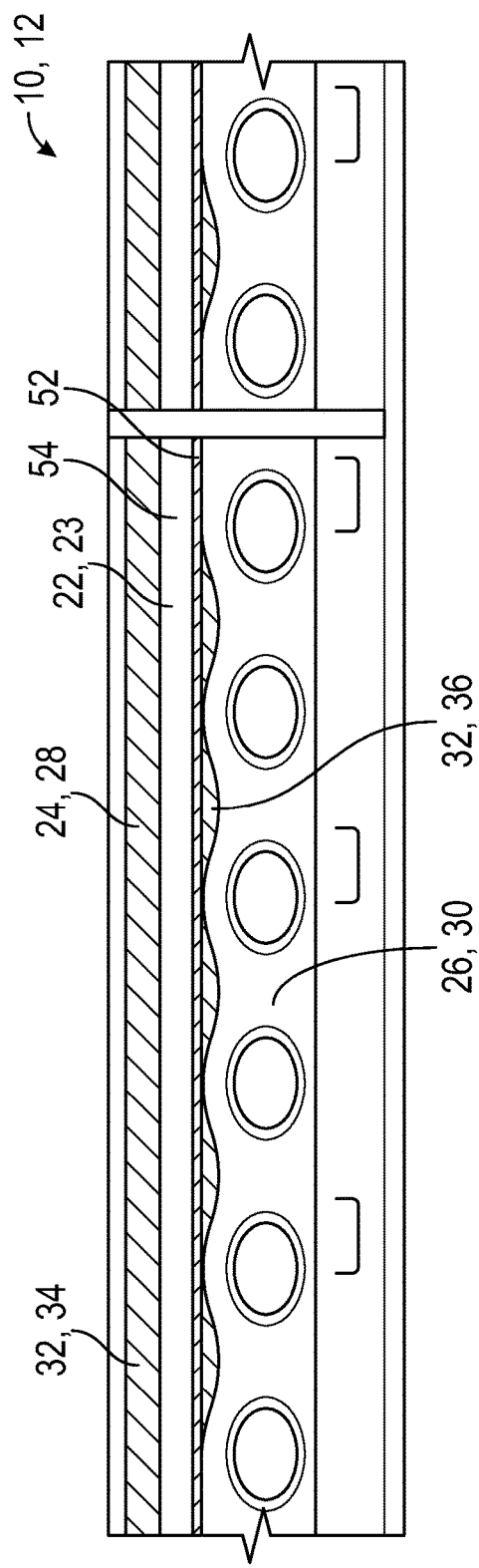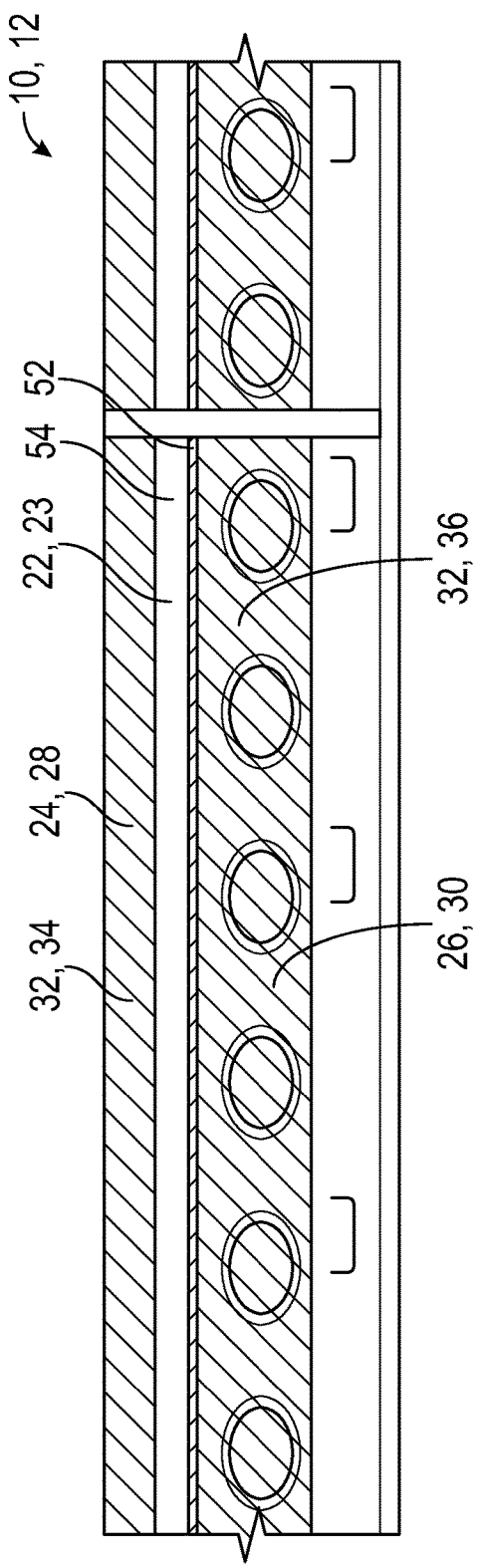

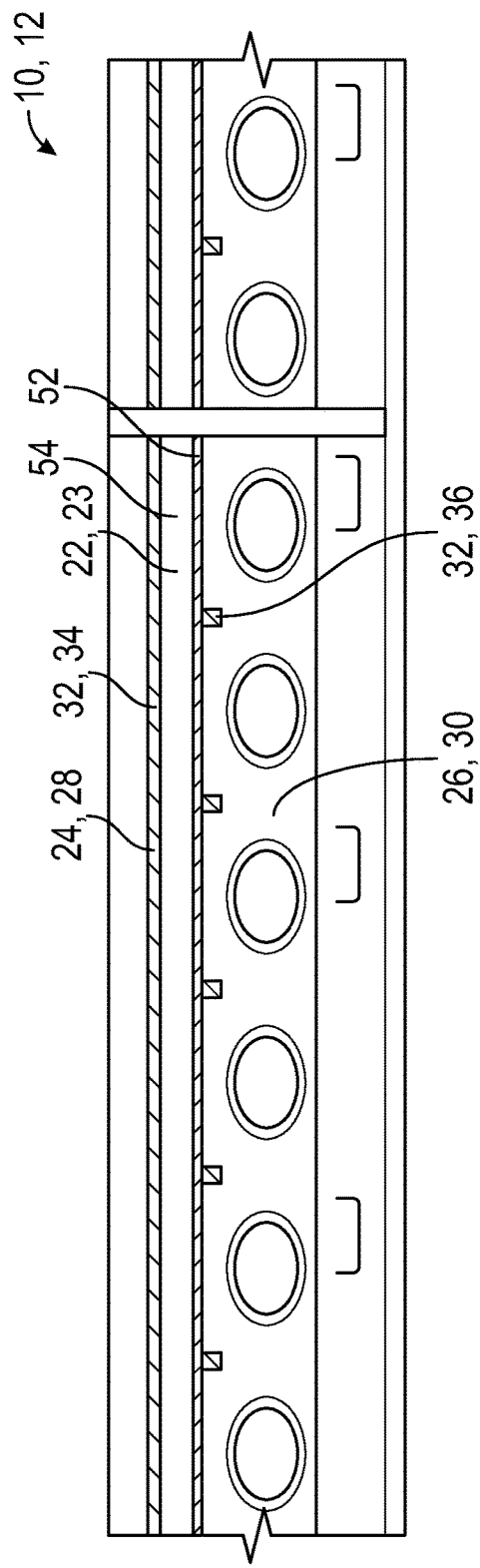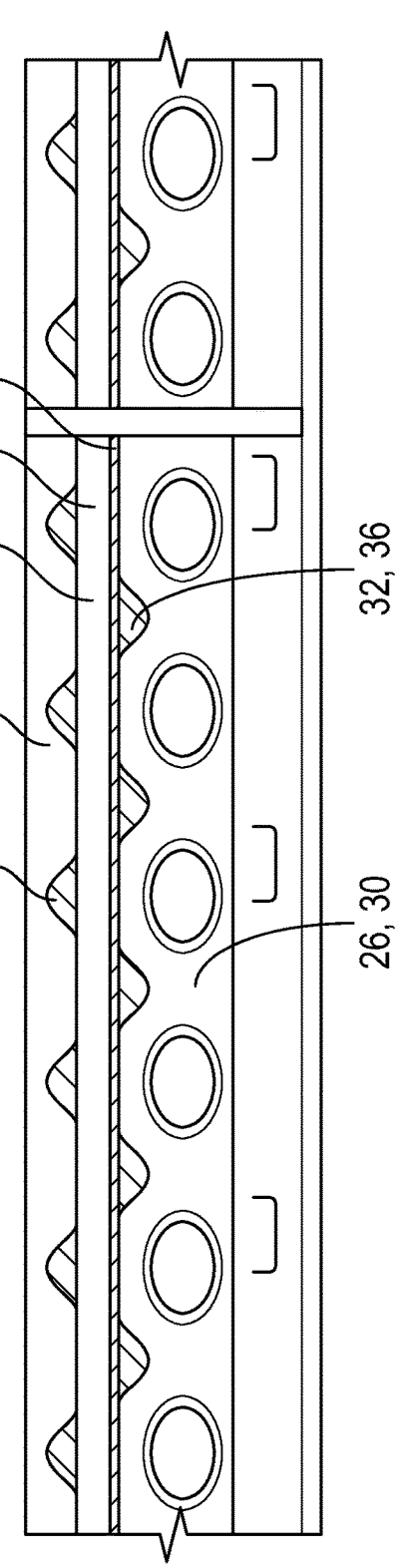
FIG. 17
FIG. 18 ic # VARIABLE LIGHTING SYSTEM FOR A VEHICLE

CROSS-REFERENCE TO RELATED APPLICATIONS

This application is related to and claims all available benefit of U.S. Provisional Patent Application 62/916,548 filed Oct. 17, 2019, the entire contents of which are herein incorporated by reference.

TECHNICAL FIELD

The technical field relates generally to lighting systems for vehicles, and more particularly, relates to lighting systems that provide varied and/or dynamic illumination intensities to vehicle interiors such as, for example, an aircraft cabin or the like.

BACKGROUND

Lighting systems for providing ambient lighting to passengers and/or other occupants of vehicles has traditionally been a priority for vehicle manufacturers. For example, lighting systems are often provided in many aircraft for such purposes. These lighting systems may include a plurality of lighting elements disposed in, for example, the interior of the vehicle for providing ambient lighting. The lighting systems provide light to a discreet area, portion, location, or the like of the vehicle interior such as a passenger seating area of an aircraft interior, a cabin washroom area of an aircraft interior, and/or other areas of the aircraft interior.

Existing lighting systems for aircraft and/or other vehicles include lighting element(s) that operate collectively in the lighting system. For example, a passenger and/or other occupant of a cabin washroom area having a lighting system that includes a plurality of lighting elements can adjust the illumination of the lighting elements collectively to be at, for example, 0% illumination, 50% illumination, or 100% illumination by a dimmer switch, button, or the like. Unfortunately, independently adjusting the illumination intensity of each independent lighting element of the lighting system cannot be accomplished. Further, in a vehicle interior area such as a passenger seating area of an aircraft interior, lighting systems that include lighting elements that collectively illuminate to substantially the same lighting intensity throughout the passenger seating area are aesthetically unimpressive.

Accordingly, it is desirable to provide lighting systems for a vehicle that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an interior panel for an interior of a vehicle, a vehicle, and a method for making an interior panel of a vehicle are provided herein.

In a first non-limiting embodiment, the interior panel includes, but is not limited to, a first trim section having a first exposed surface configured to face towards the interior. The interior panel further includes, but is not limited to, a second trim section that has a second exposed surface configured to face towards the interior and that is disposed adjacent to and spaced apart from the first trim section to define a first gap. The interior panel further includes, but is not limited to, a first lighting array that includes a first plurality of light source and that is configured to be disposed proximate the first gap hidden form the interior by the second trim section. The interior panel further includes, but is not limited to, a controller that is configured to be in communication with the first lighting array to independently direct each light source of the first plurality of light sources to generate light that passes through the gap into the interior and illuminates at least a portion of the first exposed surface to define a first portion of an illumination pattern.

In another non-limiting embodiment, the vehicle includes, but is not limited to, a vehicle structure having an interior. The vehicle further includes, but is not limited to, an interior panel disposed in the vehicle. The interior panel includes a first trim section having a first exposed surface facing towards the interior. A second trim section has a second exposed surface facing towards the interior and is disposed adjacent to and spaced apart from the first trim section to define a first gap. A first lighting array that includes a first plurality of light sources is disposed proximate the first gap hidden from the interior buy the second trim section. A controller is in communication with the first lighting array to independently direct each light source of the first plurality of light sources to generate light that passes through the first gap into the interior and illuminates at least a portion of the first exposed surface to define a first illumination pattern.

In another non-limiting embodiment, the method includes, but is not limited to, obtaining a first trim section having a first exposed surface that is configured to face towards the interior. The method further includes, but is not limited to, obtaining a second trim section that has a second exposed surface that is configured to face towards the interior. The method further includes, but is not limited to, disposing the second trim section adjacent to and spaced apart from the first trim section to define a gap. The method further includes, but is not limited to, disposed a lighting array that includes a plurality of light sources proximate the gap such that the lighting array is configured to be hidden from the interior by the second trim section. The method further includes, but is not limited to, electrically coupling a controller to the lighting array. The controller is configured to independently direct each light source of the plurality of light sources to generate light that passes through the gap into the interior and illuminates at least a portion of the first exposed surface to define an illumination pattern.

BRIEF DESCRIPTION OF THE DRAWINGS

The various embodiments will hereinafter be described in conjunction with the following drawing figures, wherein like numerals denote like elements, and wherein:

FIGS. 5-19 illustrate various illumination patterns generated by a lighting system for a vehicle in accordance with various exemplary embodiments;

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

The exemplary embodiments taught herein provide an interior panel for an interior of a vehicle, for example, an aircraft or the like. The interior panel includes a first trim section that has a first exposed surface that faces towards the interior. A second trim section with a second exposed surface that faces towards the interior is disposed adjacent to and spaced apart from the first trim section to define a gap. A lighting array that includes a plurality of light sources is disposed proximate the first gap and is hidden form the interior by the second trim section. In one example, the second trim section includes a channel that extends on a side opposite the second exposed surface proximate to the gap, and the lighting array is disposed in the channel. A controller is in communication with the lighting array to independently direct each light source of the plurality of light sources to generate light that passes through the gap into the interior and illuminates at least a portion of the first exposed surface to define a first portion of an illumination pattern. For example, the controller may direct a first light source to generate light at a first illumination intensity and a second light source to generate light at a second illumination intensity that is different from the first illumination intensity to form a portion of an illumination pattern.

As such, advantageously, the controller is operative to direct the light sources to display various illumination patterns onto the first exposed surface in the interior of the vehicle. The illumination patterns may be dynamic, for example, for varying illumination intensity and/or shape along the first exposed surface and/or may vary in intensity and/or shape with time. Additionally, because each light source is directed independently by the controller, the ability to customize the illumination pattern, for example, via a user interface is provided. Such interior panels therefore provide illumination patterns that are both customizable and aesthetically appealing.

Figure 1:
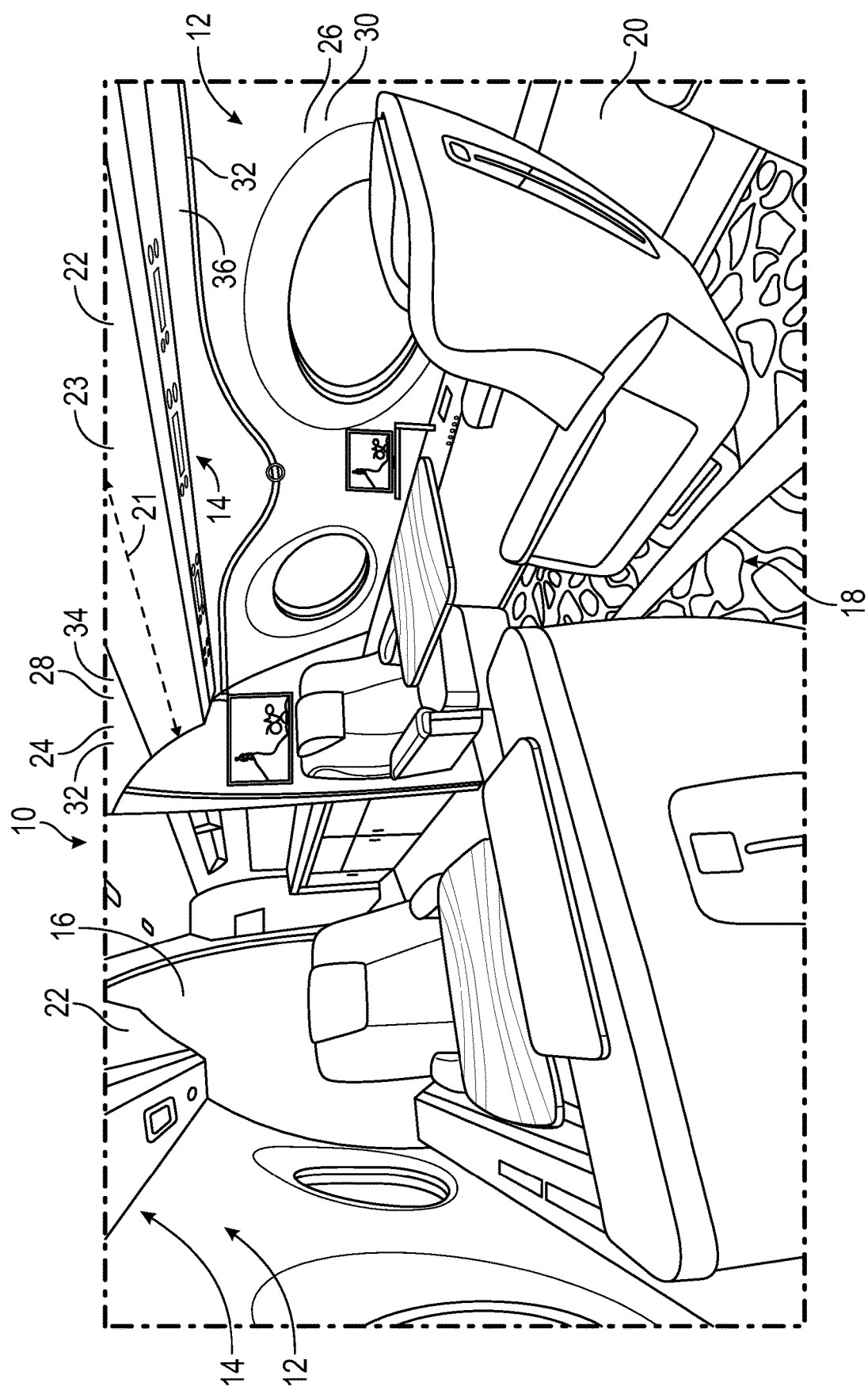
FIG. 1 illustrates a perspective view of a portion of a vehicle including an interior panel that has a lighting system in accordance with an exemplary embodiment.

FIG. 1 illustrates a perspective view of a portion of a vehicle 10 including an interior panel 12 that has a lighting system 14 in accordance with an exemplary embodiment. The vehicle 10 includes a vehicle structure 16 that has an interior 18 (e.g., the vehicle structure 16 at least partially surrounds the interior 18). As illustrated, the vehicle 10 is an aircraft and the vehicle structure 16 is an aircraft structure such as, for example, a fuselage. In an exemplary embodiment, the interior 18 includes one or more interior areas 20. The interior area(s) 20 may be, for example, a cabin area, a lavatory area, a cockpit area, and/or the like.

As illustrated, the interior panel 12 is configured as an interior trim panel that is disposed on, covering, and/or forming a part of the vehicle structure 16, facing towards to the interior 18. In an exemplary embodiment, the interior panel 12 is disposed in and/or forms part of an interior area 20. Although the vehicle 10 is illustrated as having two interior panels 12 (e.g., left and right side interior panels), it should be understood that various embodiments of the vehicle 10 may include the vehicle 10 having a single interior panel 12 or more than two interior panels 12. Further, if the vehicle 10 includes more than one interior panel 12 each with a corresponding lighting system 14, the lighting systems 14 may operate independently or cooperatively with each other.

In an exemplary embodiment, the interior panel 12 includes a plurality of adjacent trim sections 22, 24, and 26 that may be assembled or otherwise coupled together, or they may be integrally formed together. As illustrated, the trim section 22 is disposed between the trim sections 24 and 26. One or both of trim sections 24 and 26 have exposed surfaces 28 and/or 30, respectively, that face towards the interior 18. The exposed surfaces 28 and 30 are separated by the trim section 22. For example, the trim section 22 extends along a longitudinal axis 21 and the exposed surface 28 is disposed laterally upward from the trim section 22 extending along or substantially parallel to the longitudinal axis 21. Likewise, the exposed surface 30 is disposed laterally downward from the trim section 22 extending along or substantially parallel to the longitudinal axis 21. As illustrated, the trim section 22 has an exposed surface 23 that faces towards the interior 18 and includes the lighting system 14. The lighting system 14 is configured to illuminate at least a portion of at least one of the exposed surfaces 28 and 30 to define an illumination pattern(s) 32 as will be discussed in further detail below.

As illustrated, the illumination pattern 32 includes illumination pattern portions 34 and 36, which are defined on exposed surfaces 28 and 30, respectively. However, it is to be understood that the illumination pattern portion 34 or 36 may completely define the illumination pattern 32, or the illumination pattern 32 may include additional illumination pattern portions in addition to the illumination pattern portion 34 and/or 36. In an exemplary embodiment, the illumination pattern portion 34 is upwash lighting and the illumination pattern portion 36 is downwash lighting. The trim section 22 separates the upwash and downwash lighting such that the illumination pattern portion 34 is displayed or otherwise projected laterally upward from the trim section 22 onto the exposed surface 28 of the trim section 24 and the illumination pattern portion 36 is displayed or otherwise projected laterally downward from the trim section 22 onto the exposed surface 30 of the trim section 26.

Figure 2:
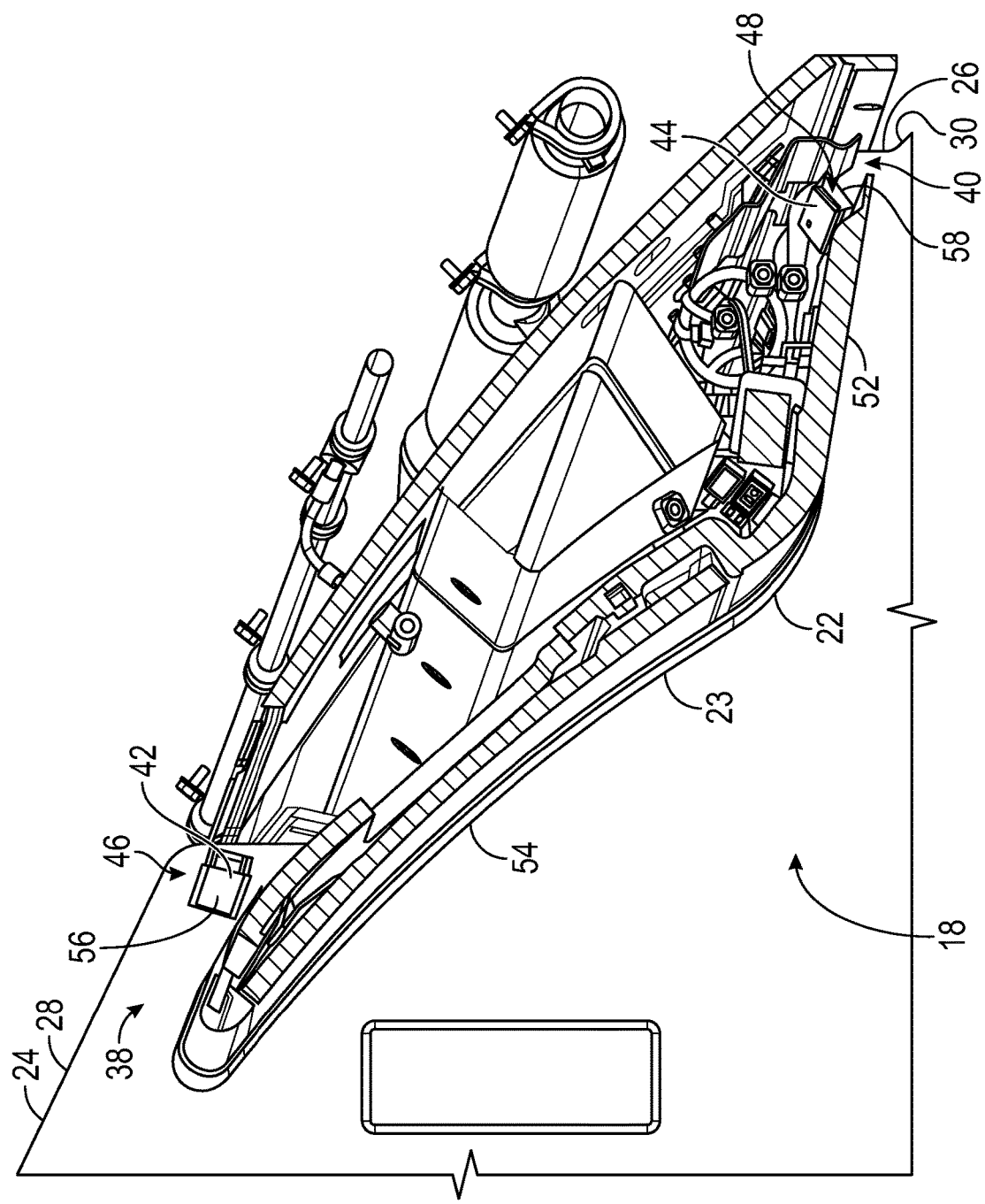
FIG. 2 illustrates a cross-sectional view of an interior panel including a lighting system in accordance with an exemplary embodiment.

Referring also to FIG. 2, a cross-sectional view of the interior panel 12 in accordance with an exemplary embodiment is provided. The trim sections 24 and 26 are disposed adjacent to and spaced apart from the trim section 22 to define gaps 38 and 40, respectively. The lighting system 14 includes lighting arrays 42 and 44 that are disposed proximate the gaps 38 and 40, respectively, hidden from the interior 18 by the trim section 22. As used herein, the term "hidden" refers to the lighting arrays 42, 44 being out of direct line of sight from, for example, a passenger seated in passenger seating 43 in the interior 18. In this way, the lighting arrays 42, 44 are covered by the trim section 22 and thus, not visible to passengers in the interior 18 of the vehicle 10, while the illumination pattern 32 generated by the lighting arrays 42, 44 are visible to such passengers.

The trim section 22 includes channels 46 and 48 (e.g., upper and lower channels) that extend on a side opposite the exposed surface 23 proximate to the gaps 38 and 40, respectively. In an exemplary embodiment, the lighting arrays 42 and 44 are disposed in the channels 46 and 48, respectively. In an exemplary embodiment, the channels 46 and 48 and the lighting arrays 42 and 44 extend along or substantially parallel to the longitudinal axis 21 of the trim section 22.

The trim section 22 has a lower trim portion 52 disposed adjacent to and extending transversely away from trim section 26, towards the interior 18, to an upper trim portion 54 that extends transversely and generally upward from the lower trim portion 52. As such, the lower trim portion 52 is spaced apart from the trim section 26 to define the gap 30 and the upper trim portion 54 is spaced apart from the trim section 24 to define the gap 28.

Figure 3:
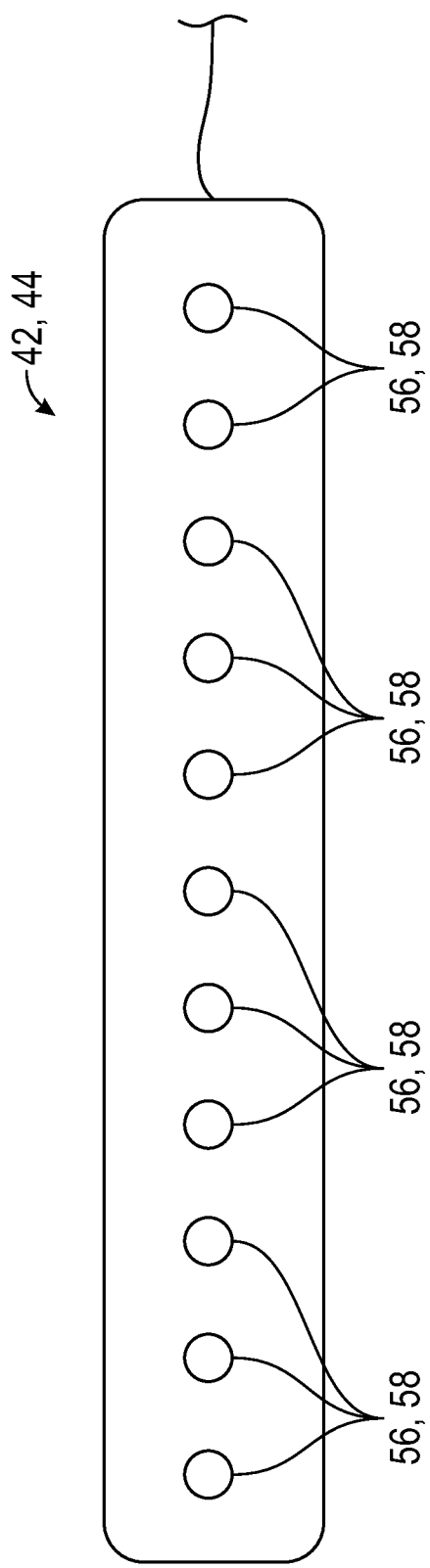
FIG. 3 illustrates a top view of a lighting array in accordance with an exemplary embodiment.

Referring also to FIG. 3, the lighting arrays 42 and 44 include pluralities of the light sources 56 and 58, respectively, that are spaced apart and that are configured to generate light. The light sources 56 and 58 are disposed such that at least a portion of the light travels through the respective gap 38 or 40 and illuminates at least a portion of the respective exposed surface 28 or 30. For example, lighting array 42 is disposed in the channel 46 covered by the trim section 22 but proximate to the gap 38 such that there is an unobstructed line (e.g., direct line of sight) through the gap 38 between the plurality of light sources 56 and the exposed surface 28. Likewise, the lighting array 44 is disposed in the channel 48 covered by the trim section 22 but proximate to the gap 40 such that there is an unobstructed line (e.g., direct line of sight) through the gap 40 between the plurality of light sources 58 and the exposed surface 30. As such, the lighting array 42 is positioned laterally upward from the longitudinal axis 21 and the lighting array 44 is positioned laterally downward from the longitudinal axis 21. In an exemplary embodiment, the lighting arrays 42 and 44 are light-emitting diode (LED) strips (e.g., LED arrays, LED ropes, or the like) and the pluralities of light sources 56 and 58 are LEDs. As illustrated, the pluralities of light sources 56 and 58 arranged in the respective channels 46 and 48 along or substantially parallel to the longitudinal axis 21 facing towards the respective exposed surface 28 and 30.

Figure 4:
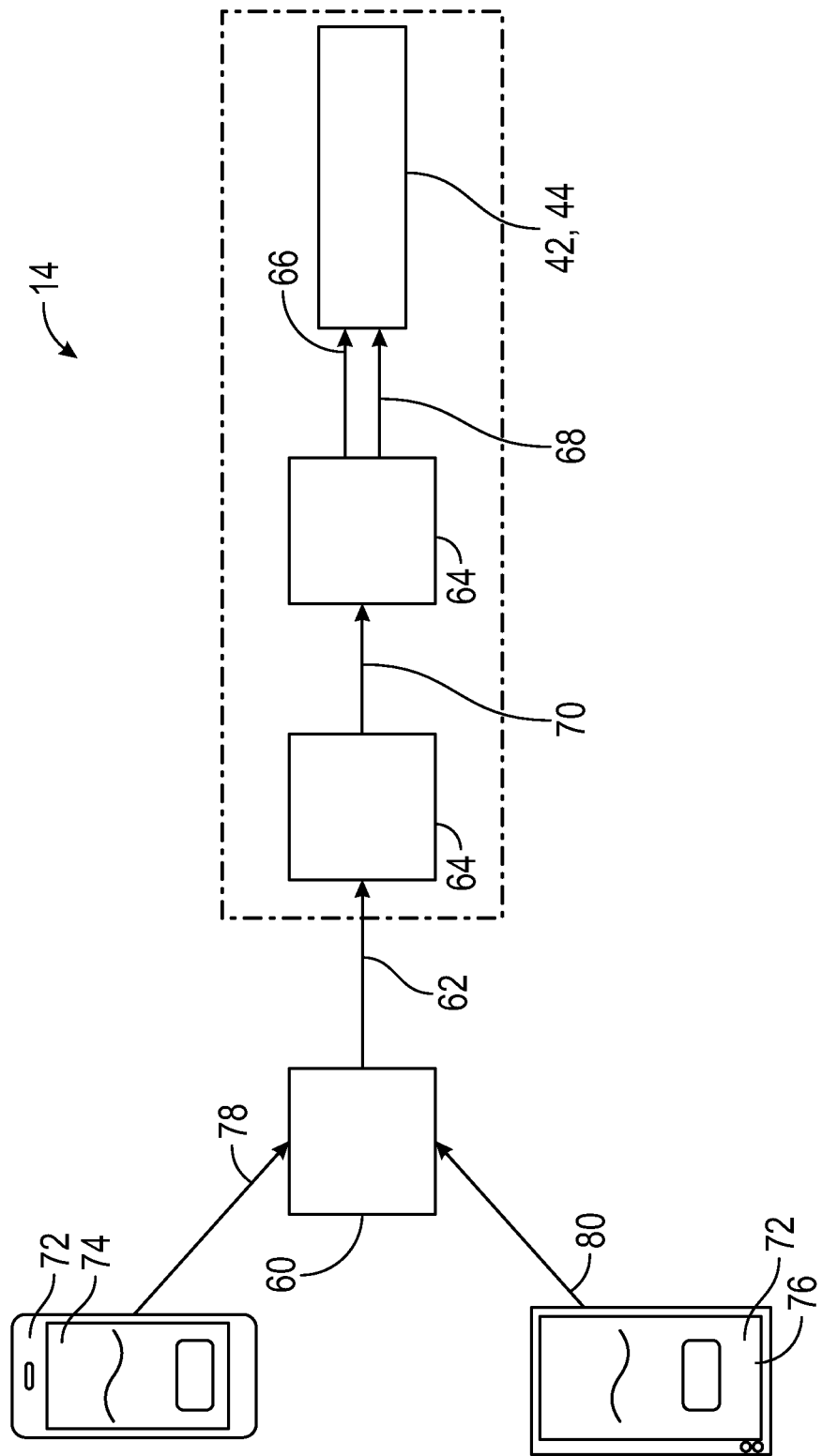
FIG. 4 illustrates a block diagram of a lighting system in accordance with an exemplary embodiment.

Referring also to FIG. 4, the lighting system 14 further includes a controller 60, for example, a cabin management system, computer, device containing one or more processors, or the like that is in communication with the lighting arrays 42 and 44. The controller 60 is configured to independently direct each light source of the pluralities of light sources 56 and 58 to generate light that passes through the respective gap 38 or 40 into the interior 18 and illuminates at least a portion of the respective exposed surface 28 or 30 to define the corresponding illumination pattern portions 34 and/or 36. As used herein, the term "independently" means that each light source of the pluralities of light sources 56 and 58 is configured to receive a corresponding or distinct command signal (via line 62) from the controller 60 that directs the distinct light source to either generate light at a specific illumination intensity or to prevent generation of light (e.g., in an "off condition") from that light source and that the command signal 62 may be the same as or different from the other command signals 62 received by the other light sources of the pluralities of light sources 56 and 58. For example, the controller 60 may direct one light source to generate light at an illumination intensity of 50% (where 0% is no illumination and 100% is the maximum illumination of the respective light source) while the controller 60 directs another light source to generate light at an illumination intensity of 100%. As such, each of the light sources of the pluralities of light sources 56 and 58 can generate light at a corresponding illumination intensity from 0% illumination to 100% illumination independent from the other light sources. In this way, in an exemplary embodiment, advantageously the lighting system 14 can generate various, unique illumination patterns 32 as will be discussed in further detail below.

In an exemplary embodiment, the illumination intensity of each of the light sources of the pluralities of light sources 56 and 58 is variable, for example, with time. For example, the controller 60 may direct a light source(s) to generate light at an illumination intensity of 40% at time t=0 seconds and progressively increase the illumination intensity to 60% at time t=5 seconds. As such, the illumination pattern 32 may vary as a function of time.

In an exemplary embodiment, the lighting system 14 further includes one or more power supply module(s) 64 that are in communication with the controller 40 and the pluralities of light sources 56 and 58 to receive the command signal 62 and direct the light sources to independently generate light at a corresponding illumination intensity that is variable or constant with time via lines 66 and/or 68. As illustrated, the lighting system 14 includes a plurality of power supply modules 64 that are in communication via line 70 to communicate the command signal 62 to the pluralities of light sources 56 and 58 via lines 66 and 68.

In an exemplary embodiment, the lighting system 14 includes a user interface 72 that is in communication with the controller 60. As illustrated, the user interface 72 can be a wireless user interface 74 such as a phone, tablet, computer, or the like, or alternatively, a wired user interface 76 that is wired to the controller 70. A user can utilize the user interface 72 to generate a command signal via line 78 and/or 80 to the controller 70. The command signal 78 and/or 80 is generated, for example, in response to the user selecting an illumination pattern(s) 32 to be projected onto the exposed surfaces 28 and 30 in the interior 18. For example, the user may select an illumination pattern from a plurality of selectable or predetermined illumination patterns. Alternatively, the user may adjust the illumination pattern as desired by, for example, adjusting the illumination intensity of the light sources on one or more adjustable dimmer slides on the user interface 52. The controller 70 generates the command signal 62 in response to the command signal 78 and/or 80.

Figure 7:
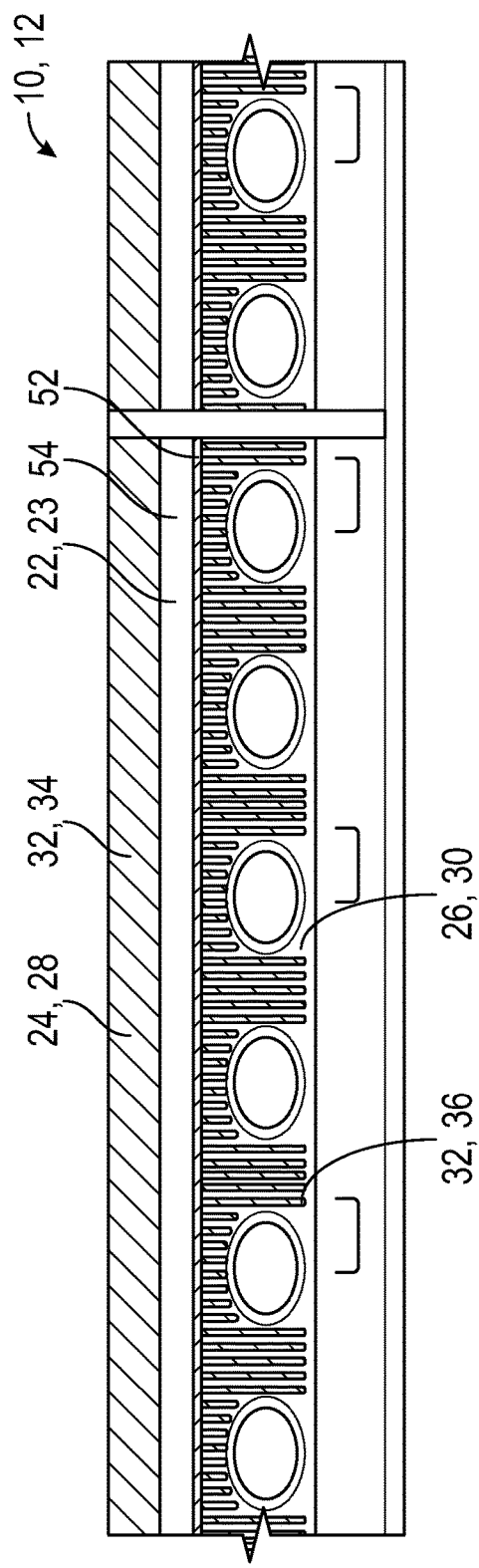
Figure 8:
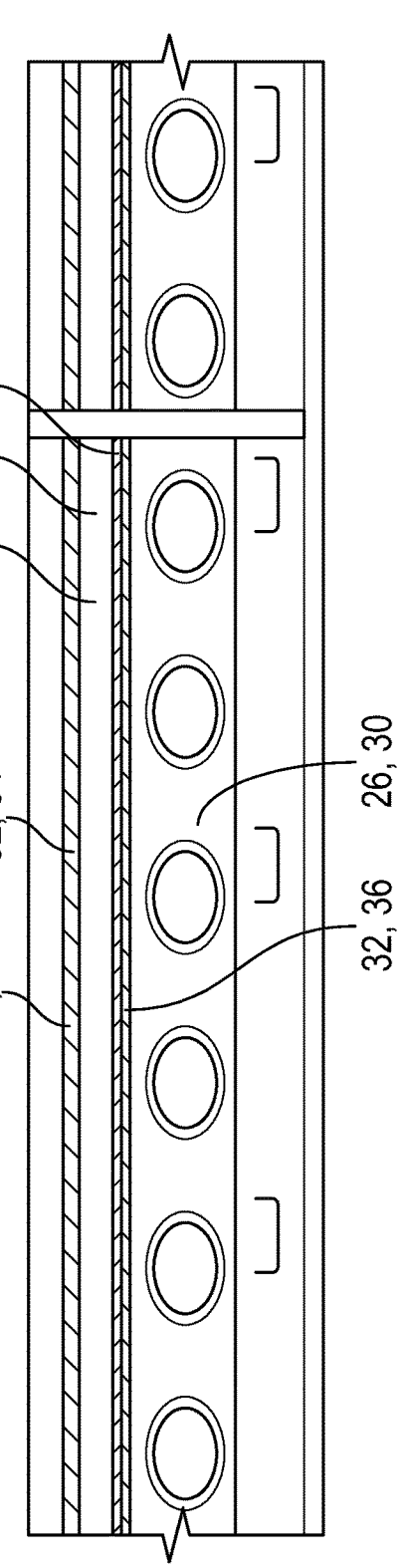
Figure 15:
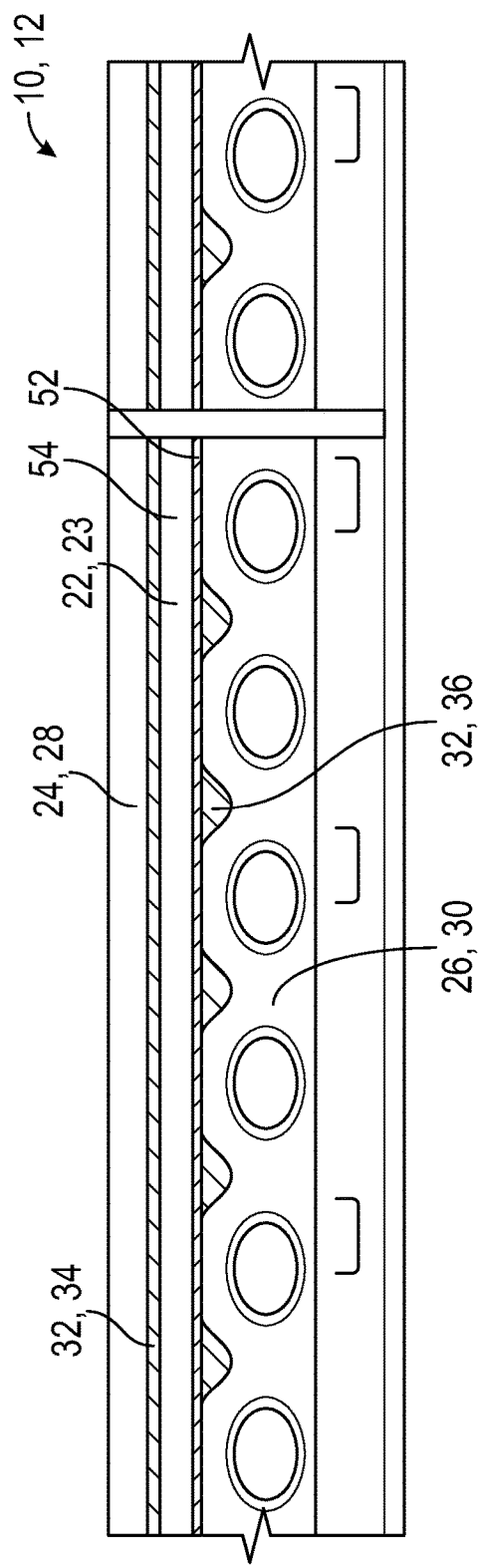
Figure 16:
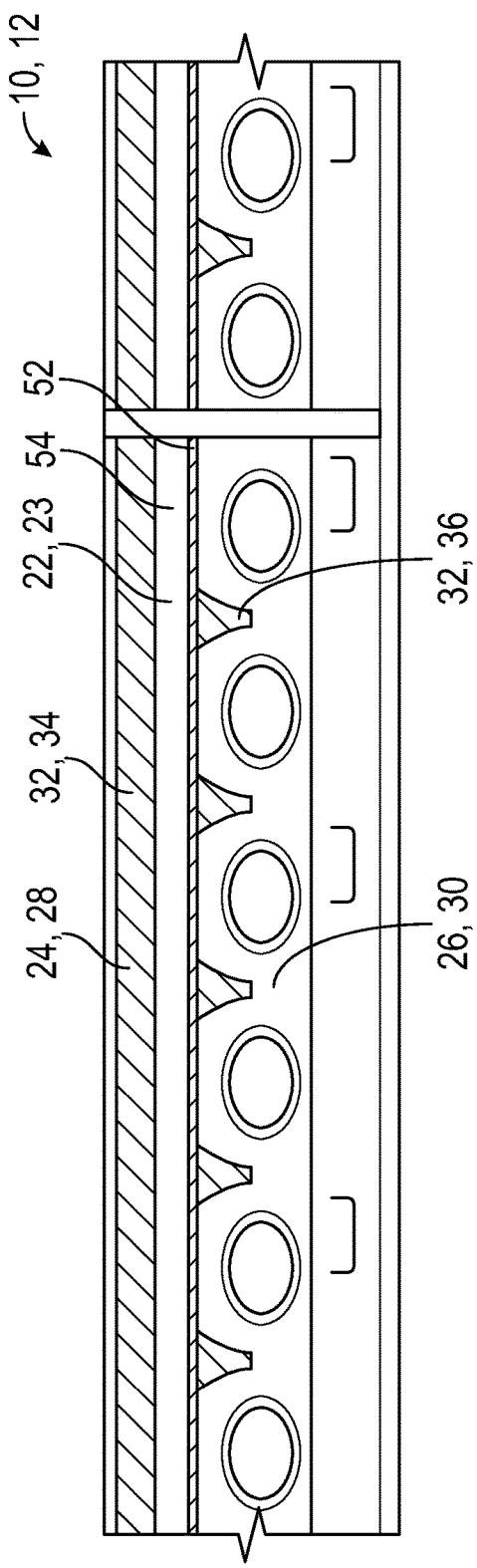
Figure 19:
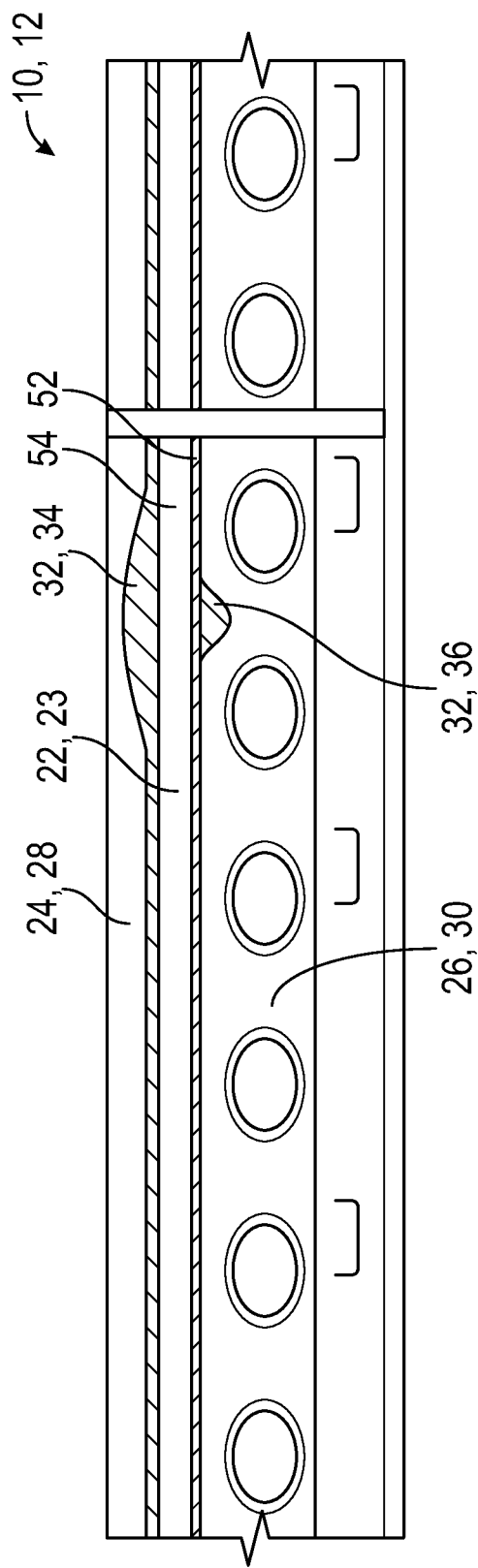
Figure 20:
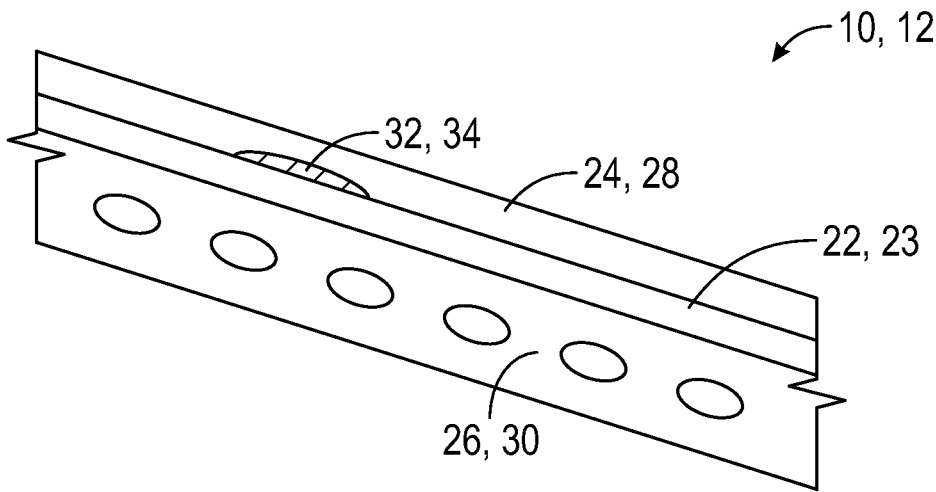
FIGS. 20-24 illustrate a time dependent illumination pattern generated by a lighting system for a vehicle at various points in time in accordance with an exemplary embodiment.
Figure 21:
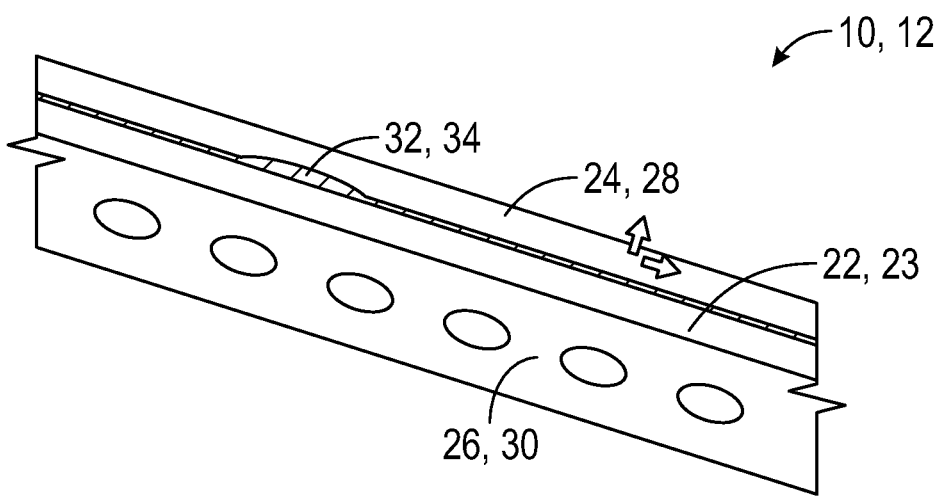
Figure 22:
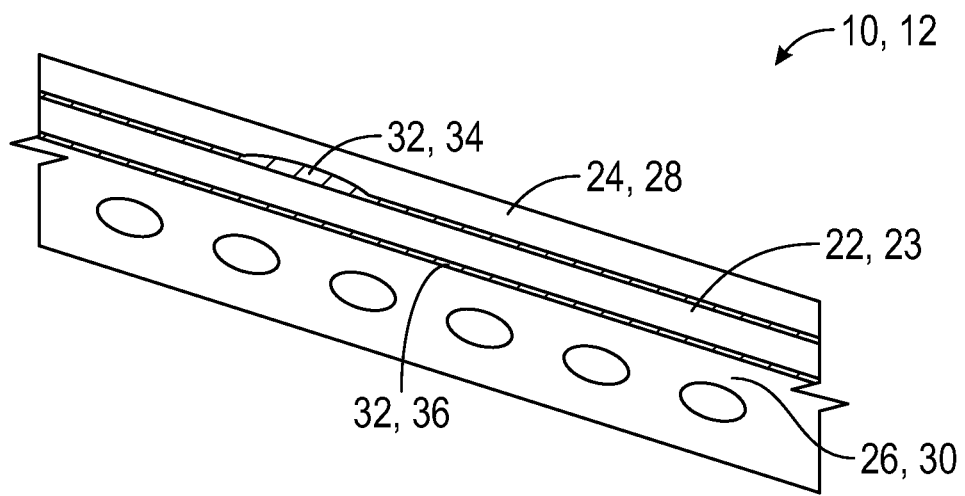
Figure 23:
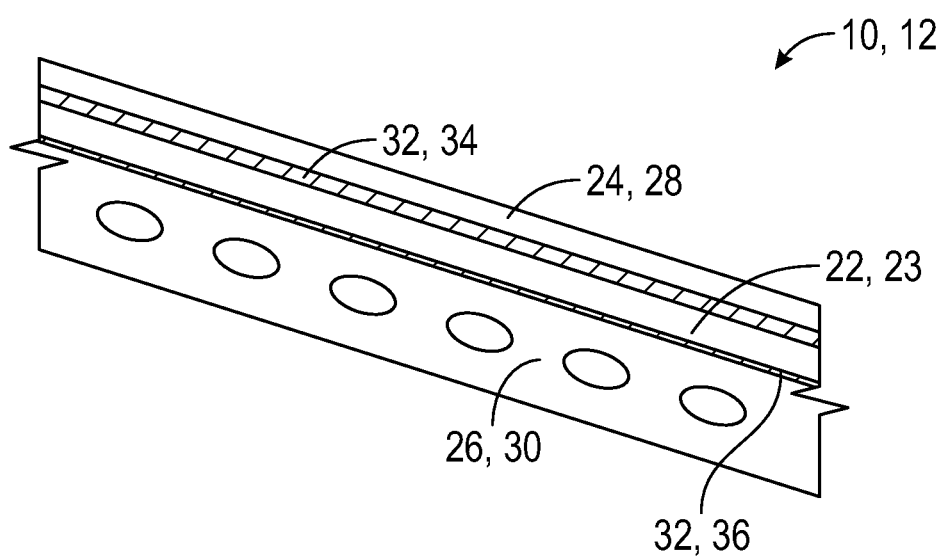
Figure 24:
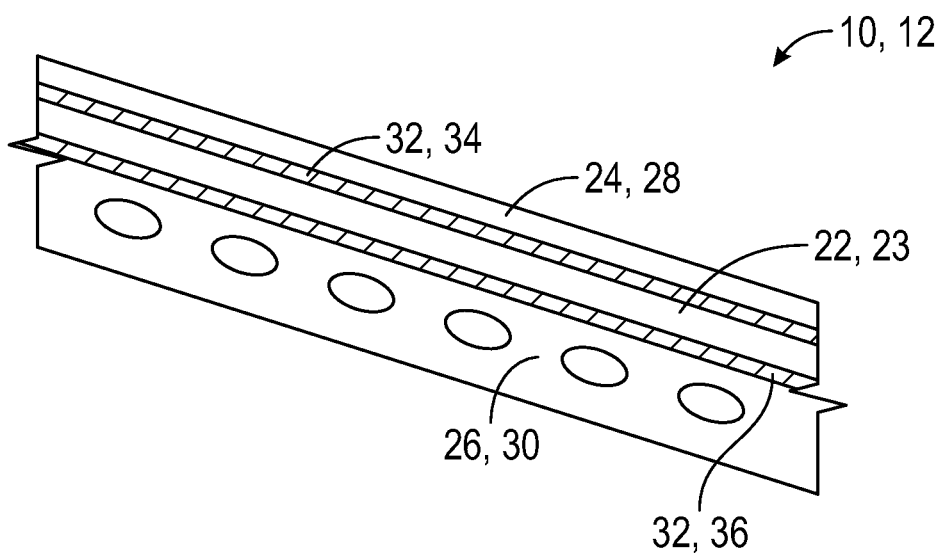

FIGS. 5-19 illustrate various illumination patterns 32 generated by the lighting system 14 for the vehicle 10 in accordance with various exemplary embodiments. FIG. 5 includes the illumination pattern portion 34 having a rectangular shape and the illumination pattern portion 36 having a rectangular shape in accordance with an exemplary embodiment. FIG. 6 includes the illumination pattern portion 34 having a rectangular shape and the illumination pattern 36 having a wave-like shape in accordance with an exemplary embodiment. FIG. 7 includes the illumination pattern portion 34 having a rectangular shape and the illumination pattern portion 36 having a series of spaced apart lines of varying lengths extending laterally (e.g., vertically) to the longitudinal axis 21 in accordance with an exemplary embodiment. FIG. 8 includes the illumination patterns 34 and 36 having thin rectangular shapes in accordance with an exemplary embodiment. FIG. 9 includes the illumination pattern 34 having a laterally thin rectangular shape without any illumination pattern 36 in accordance with an exemplary embodiment. FIG. 10 includes illumination patterns 34 and 36 having rectangular shapes in accordance with an exemplary embodiment. FIG. 11 includes illumination patterns 34 and 36 having wave-like shapes in accordance with an exemplary embodiment. FIG. 12 includes illumination pattern 34 having a rectangular shape and illumination pattern 36 having a wave-like shape in accordance with an exemplary embodiment. FIG. 13 includes illumination pattern 34 having a rectangular shape and illumination shape 36 having a wave-like shape in accordance with an exemplary embodiment. FIG. 14 includes illumination pattern 34 having a rectangular shape and illumination pattern 36 having a rectangular shape in accordance with an exemplary embodiment. FIG. 15 includes illumination pattern 34 having a rectangular shape and illumination pattern 36 having a wave-like shape in accordance with an exemplary embodiment. FIG. 16 includes illumination pattern 34 having a rectangular outline and illumination pattern 36 having a repeating, substantially triangular, truncated shape in accordance with an exemplary embodiment. FIG. 17 includes illumination pattern 34 having a rectangular outline and illumination pattern 36 having lateral lines that are spaced apart in accordance with an exemplary embodiment. FIG. 18 includes illumination patterns 34 and 36 having wave-like outlines in accordance with an exemplary embodiment. FIG. 19 includes illumination patterns 34 and 36 having opposing single wave-like shapes in accordance with an exemplary embodiment.

FIGS. 20-24 illustrate a time dependent illumination pattern 32 generated by the lighting system 14 for the vehicle 10 in accordance with various exemplary embodiments. As illustrated, consecutive snapshots in time of the illumination pattern 32 that varies with time are progressive shown.

Figure 25:
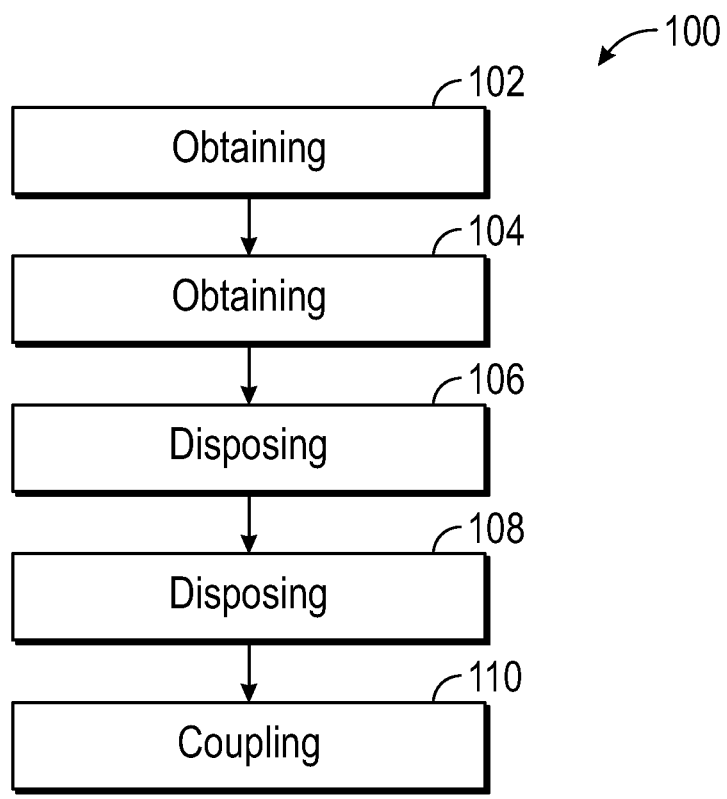
FIG. 25 illustrates a block diagram of a method for making an interior panel for an interior of a vehicle in accordance with an exemplary embodiment.

Referring to FIG. 25, a method 100 for making an interior panel for an interior of a vehicle in accordance with an exemplary embodiment is provided. The method 100 includes obtaining (STEP 102) a first trim section having a first exposed surface that is configured to face towards the interior. A second trim section that has a second exposed surface that is configured to face towards the interior is obtained (STEP 104). The second trim section is disposed (STEP 106) adjacent to and spaced apart from the first trim section to define a gap. A lighting array that includes a plurality of light sources is disposed (STEP 108) proximate the gap such that the lighting array is configured to be hidden from the interior by the second trim section. A controller is electrically coupled (STEP 110) to the lighting array. The controller is configured to independently direct each light source of the plurality of light sources to generate light that passes through the gap into the interior and illuminates at least a portion of the first exposed surface to define an illumination pattern.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for an interior of a vehicle, the interior panel comprising:
a first trim section having a first exposed surface configured to face towards the interior;
a second trim section that has a second exposed surface configured to face towards the interior and that is disposed adjacent to and spaced apart from the first trim section to define a first gap;
a first lighting array that includes a first plurality of light sources and that is configured to be disposed proximate the first gap hidden from the interior by the second trim section; and
a controller that is configured to be in communication with the first lighting array to independently direct each light source of the first plurality of light sources to generate light that passes through the gap into the interior and illuminates at least a portion of the first exposed surface to define a first portion of an illumination pattern.

2. The interior panel of claim 1, wherein the controller is configured to independently direct each light source of the first plurality of light sources to generate light at a corresponding illumination intensity that is variable.

3. The interior panel of claim 1, wherein the controller is configured to receive a command signal corresponding to the illumination pattern, and wherein the controller directs the first plurality of light sources to generate light to define the first portion of the illumination pattern in response to the command signal.

4. The interior panel of claim 3, wherein the controller is configured to be in communication with a user interface that generates the command signal in response to user selection of the illumination pattern from a plurality of selectable illumination patterns.

5. The interior panel of claim 1, wherein the second trim section has a first channel that extends on a side opposite the second exposed surface proximate to the first gap, and wherein the first lighting array is disposed in the first channel.

6. The interior panel of claim 5, wherein the second trim section has a lower trim portion disposed adjacent to and extending transversely away from the first trim section to an upper trim portion that extends transversely and generally upward from the lower trim portion, and wherein the lower trim portion is spaced apart from the first trim section to define the first gap.

7. The interior panel of claim 6, wherein the interior panel further includes a third trim section that has a third exposed surface configured to face towards the interior and that is disposed adjacent to and spaced apart from the upper trim portion of the second trim section to define a second gap, wherein the interior panel further includes a second lighting array that includes a second plurality of light sources and that is configured to be disposed proximate the second gap hidden from the interior by the second trim section, and wherein the controller is configured to be in communication with the second lighting array to independently direct each light source of the second plurality of light sources to generate light that passes through the second gap into the interior and illuminates at least a portion of the third exposed surface to define a second portion of the illumination pattern.

8. The interior panel of claim 7, wherein the first portion of the illumination pattern and the second portion of the illumination pattern define the illumination pattern.

9. The interior panel of claim 7, wherein the second trim section has a second channel that extends on a side opposite the second exposed surface proximate to the second gap, and wherein the second lighting array is disposed in the second channel.

10. The interior panel of claim 1, wherein the illumination pattern varies as a function of time.

11. The interior panel of claim 1, wherein the first plurality of light sources are light-emitting diodes.

12. A vehicle comprising:
a vehicle structure having an interior; and
an interior panel disposed in the vehicle, the interior panel comprising:
- a first trim section having a first exposed surface facing towards the interior;
- a second trim section that has a second exposed surface facing towards the interior and that is disposed adjacent to and spaced apart from the first trim section to define a first gap;
- a first lighting array that includes a first plurality of light sources and that is disposed proximate the first gap hidden from the interior by the second trim section; and
- a controller in communication with the first lighting array to independently direct each light source of the first plurality of light sources to generate light that passes through the first gap into the interior and illuminates at least a portion of the first exposed surface to define a first illumination pattern.

13. The vehicle of claim 12, wherein the controller is configured to independently direct each light source of the first plurality of light sources to generate light at a corresponding illumination intensity that is variable.

14. The vehicle of claim 13, wherein the vehicle further includes a user interface that generates a command signal in response to user selection of the illumination pattern from a plurality of selectable illumination patterns, and wherein the controller is in communication with the user interface to receive the command signal, and wherein the controller directs the first plurality of light sources to generate light to define the first portion of the illumination pattern in response to the command signal.

15. The vehicle of claim 14, wherein the second trim section has a first channel that extends on a side opposite the second exposed surface proximate to the first gap, and wherein the first lighting array is disposed in the first channel.

16. The vehicle of claim 15, wherein the second trim section has a lower trim portion disposed adjacent to and extending transversely away from the first trim section to an upper trim portion that extends transversely and generally upward from the lower trim portion, and wherein the lower trim portion is spaced apart from the first trim section to define the first gap.

17. The vehicle of claim 16, wherein the interior panel further includes a third trim section that has a third exposed surface facing towards the interior and disposed adjacent to and spaced apart from the upper trim portion of the second trim section to define a second gap, wherein the interior panel further includes a second lighting array that includes a second plurality of light sources and that is disposed proximate the second gap hidden from the interior by the second trim section, and wherein the controller is in communication with the second lighting array to independently direct each light source of the second plurality of light sources to generate light that passes through the second gap into the interior and illuminates at least a portion of the third exposed surface to define a second portion of the illumination pattern.

18. The vehicle of claim 17, wherein the controller directs the second plurality of light sources to generate light to define the second portion of the illumination pattern in response to the command signal.

19. The vehicle of claim 18, wherein the first portion of the illumination pattern and the second portion of the illumination patter define the illumination pattern.

20. A method for making an interior panel for an interior of a vehicle, the method comprising the steps of:
- obtaining a first trim section having a first exposed surface that is configured to face towards the interior;
- obtaining a second trim section that has a second exposed surface that is configured to face towards the interior;
- disposing the second trim section adjacent to and spaced apart from the first trim section to define a gap;
- disposing a lighting array that includes a plurality of light sources proximate the gap such that the lighting array is configured to be hidden from the interior by the second trim section; and
- electrically coupling a controller to the lighting array, wherein the controller is configured to independently direct each light source of the plurality of light sources to generate light that passes through the gap into the interior and illuminates at least a portion of the first exposed surface to define an illumination pattern.

* * * * *